(12) United States Patent
Haffner

(10) Patent No.: US 8,153,952 B2
(45) Date of Patent: Apr. 10, 2012

(54) FLAME SCANNING DEVICE AND METHOD FOR ITS OPERATION

(75) Inventor: Ken Yves Haffner, Baden (CH)

(73) Assignee: ABB Research Ltd., Zurich (CH)

( * ) Notice: Subject to any disclaimer, the term of this patent is extended or adjusted under 35 U.S.C. 154(b) by 32 days.

(21) Appl. No.: 12/819,942

(22) Filed: Jun. 21, 2010

(65) Prior Publication Data

US 2010/0330516 A1 Dec. 30, 2010

Related U.S. Application Data

(63) Continuation of application No. PCT/EP2007/064188, filed on Dec. 19, 2007.

(51) Int. Cl.
*G01J 1/42* (2006.01)
(52) U.S. Cl. .......... 250/208.2; 250/216; 431/75; 431/76
(58) Field of Classification Search ............ 250/227.21, 250/227.23, 227.24, 576, 227.11, 227.2, 250/227.28; 340/578; 356/213, 218, 477, 356/478, 479, 45; 706/23, 16, 25; 364/148.02; 431/12, 75, 76, 79, 78, 14
See application file for complete search history.

(56) References Cited

U.S. PATENT DOCUMENTS

| | | | | |
|---|---|---|---|---|
| 4,220,857 A | * | 9/1980 | Bright ...................... | 250/339.15 |
| 4,222,663 A | * | 9/1980 | Gebhart et al. ............. | 356/45 |
| 4,896,965 A | | 1/1990 | Goff et al. | |
| 5,547,369 A | | 8/1996 | Sohma et al. | |
| 5,625,342 A | * | 4/1997 | Hall et al. ................... | 340/578 |
| 6,045,353 A | | 4/2000 | VonDrasek et al. | |
| 6,135,760 A | | 10/2000 | Cusack et al. | |
| 6,318,891 B1 | | 11/2001 | Haffner et al. | |
| 2006/0199123 A1 | | 9/2006 | Seguin et al. | |

FOREIGN PATENT DOCUMENTS

| | | |
|---|---|---|
| DE | 38 23 494 A1 | 1/1990 |
| DE | 199 31 111 A1 | 1/2001 |
| EP | 0 616 200 A1 | 9/1994 |
| FR | 1 587 817 A | 3/1970 |
| JP | 4-186014 A | 7/1992 |
| WO | WO 00/05556 A1 | 2/2000 |
| WO | WO 2006/091617 A1 | 8/2006 |
| WO | WO 2008/064495 A1 | 6/2008 |

OTHER PUBLICATIONS

International Search Report (PCT/ISA/210) dated Sep. 22, 2008.
International Preliminary Report on Patentability (PCT/IPEA/409) dated Feb. 22, 2010.

\* cited by examiner

*Primary Examiner* — Francis M Legasse, Jr.
(74) *Attorney, Agent, or Firm* — Buchanan Ingersoll & Rooney PC

(57) ABSTRACT

A flame scanning device is provided for monitoring a flame. The device includes a radiation collection and transmission element for collecting flame radiation and transmitting it to detection elements, a flame sensor element for the detection of radiation and conversion of the detected radiation into electrical signals, and an evaluation unit for the conversion of the electrical signals into flame parameters. The flame sensor element can include at least two individual detectors each with an individual central detection wavelength and a width of observation window, respectively. The individual central detection wavelength and the width of observation window are not overlapping and are covering individual regions of interest of the spectrum of radiation.

34 Claims, 5 Drawing Sheets
(4 of 5 Drawing Sheet(s) Filed in Color)

FLAME SCANNING DEVICE AND METHOD FOR ITS OPERATION

RELATED APPLICATION

This application claims priority as a continuation application under 35 U.S.C. §120 to PCT/EP2007/064188 filed as an International Application on Dec. 19, 2007 designating the U.S., the entire content of which is hereby incorporated by reference in its entirety

FIELD

The present disclosure relates to flame scanning devices for monitoring a flame. More particularly, the present disclosure relates to corresponding devices including a radiation collection and transmission element for collecting flame radiation and transmitting it to detection elements, a flame sensor element for the detection of radiation and conversion into electrical signals, and an evaluation unit for the conversion of the electrical signals into flame parameters. The present disclosure also relates to methods for operating such devices as well as to uses of such devices.

BACKGROUND INFORMATION

There is an increased interest in the application of control to combustion. An objective is to optimize combustor operation, monitor the process and avoid instabilities of the flame and their severe consequences. An objective is to improve the system performance, for example, by reducing the levels of harmful emissions, and to extend the stability domain by reducing oscillations induced by coupling between resonance modes and combustion. Correspondingly, monitoring of the flame by means of sensors in addition to the monitoring of the combustion products and their composition is becoming increasingly important.

The corresponding flame detection or flame scanning devices should be as reliable as possible, should allow the determination of as many as possible parameters of the flame, should be as broadly applicable as possible, and should be resistant to typical temperatures around the flames. All these requirements in principle might be met by using standard techniques. However, the problem arises that the more technically sophisticated the method of detection, and the more reliable the chosen technology, the more expensive the device becomes. Correspondingly, therefore, there is a demand for simple but nevertheless very sensitive, broadly applicable and reliable devices at low cost.

A flame scanner or flame detectors may be passive devices which record light emissions within the combustion chamber, such as IR emission of particulates following the Planck law for a given temperature, emission of different molecular species which are present during the heat release process like $OH^*$, $CH^*$, $C_2^*$, etc.

Other devices record the presence of molecules in IR by applying absorption spectroscopy. Such devices need a light source, a dispersive element, and an IR detector. These devices are active since they need a light source.

The main flame scanners give the flame on/off-status or eventually the frequency of the flame fluctuation.

More advanced sensors may give the following information:

flame parameter detection like $\lambda$ or $\phi$ (air/fuel or fuel/air ratio); OH/CH, CH/CN, OH/C$_2$, C$_2$/CH ratios give information about the temperature or stochiometry;

temperature via measurement with 2- or 3-colors pyrometry, via measurement with $H_2O$ & $CO(CO_2)$ absorption in the MIR and NIR (tuneable lasers) range;

imaging: CMOS, CCD camera multi-bands detection, flame on/off-detection;

UV and IR measurements (UV, OH, CH, $C_2$ chemiluminescence; VIS/IR Planck radiation of soot particulates);

UV/IR detection and heat release fluctuation thresholds method (high or low frequency changes).

Corresponding devices which can be used industrially are known.

For example, EP 0 616 200 discloses a device in which a camera that photographs the flame includes a plurality of photosensors which are integrated into the camera and are disposed on an imaging face thereof. The camera provides a flame image which can be displayed, and the corresponding images are analyzed for the derivation of combustion properties of the flame. The photosensors constitute a photosensor group in which each of the photosensors has a detection wavelength range, and the group of sensors covers the full contiguous visible radiation range. The photosensor values are used for the detection of radicals such as, for example, CH, OH and the like, the chemiluminescence of which can be detected in the visible range. An objective behind the device is to have a combined camera/spectrum detection device, wherein the former allows flame shape detection and the like, and the latter covers detection of the full visible wavelength range.

U.S. Pat. No. 6,045,353 discloses an a device for controlling the combustion of a burner. The device includes means for viewing the radiation emitted by the flame for collecting frame radiation intensity data as a function of time. The radiation is transported to an optical processor in which specific spectral regions of radiation are converted into electrical signals, which are then processed by a signal processor for integrating flame radiation intensity for the specific spectral regions of a period of time. The output of the signal processor is subsequently used to control the oxidant flow, fuel flow or both. Specifically, the device is located in the refractory block of the burner.

U.S. Pat. No. 6,318,891 discloses a device for determining the adiabatic temperature of a flame. The device comprises a sensor fiber which is coupled into a spectrograph. In the spectrograph, an adjustable section of the spectrum is acquired with a high resolution for individual radicals. The spectrograph thus includes a dispersive element, and the selected ranges are subsequently used in combination with theoretically calculated emission spectra for the determination of the Boltzmann temperature, which is then correlated with the adiabatic temperature of the flame.

WO 2006/091617 discloses a device for monitoring the flame across a contiguous spectrum by means of a plurality of discrete ranges measured by photodiodes. A beam splitter, which in this case is a dispersive element, is used for directing the collected light onto each of a multitude of photodiodes which cover the contiguous spectrum. The corresponding spectral range which is fully covered extends from 300 nm-1100 nm,

SUMMARY

An exemplary embodiment provides a flame scanning device for monitoring a flame. The exemplary flame scanning device includes a radiation collection and transmission element configured to collect flame radiation and transmit the collected flame radiation to detection elements. The exemplary flame scanning device also includes a flame sensor element configured to detect radiation and convert the detected radiation into electrical signals. In addition, the exemplary flame scanning device includes an evaluation unit configured to convert the electrical signals into flame parameters. The flame sensor element includes at least two individual detectors each with an individual central detection wavelength and a width of observation window, respectively. The individual central detection wavelength and the width of observation window do not overlap and cover individual regions of interest of the spectrum of radiation, respectively. The flame sensor element includes at least two detectors of a first group whose central detection wavelengths are in the range of 300 nm-700 nm, and at least two detectors of a second group whose central detection wavelengths are in the infrared range. The detectors of the first group and the detectors of the second group are arranged in a row arranged essentially transverse to a direction of impinging radiation. All the detectors of the first group are located in a central part of the row, and the detectors of the second group are all arranged at one lateral outer position or at both lateral outer positions of the row.

An exemplary embodiment provides a flame scanning device for monitoring a flame. The exemplary flame scanning device includes a radiation collection and transmission element configured to collect flame radiation and transmitting the collected flame radiation to detection elements. The exemplary flame scanning device also includes a flame sensor element configured to detect radiation and convert the detected radiation into electrical signals. In addition, the exemplary flame scanning device includes an evaluation unit configured to convert the electrical signals into flame parameters. The flame sensor element includes at least two individual detectors each with an individual central detection wavelength and a width of observation window, respectively. The individual central detection wavelength and the width of observation window do not overlap and cover individual regions of interest of the spectrum of radiation, respectively. The flame sensor element includes at least two detectors of a first group whose central detection wavelengths are in the range of 300 nm-700 nm, and at least two detectors of a second group whose central detection wavelengths are in the infrared range. The detectors of the first group and the detectors of second group are arranged in a row arranged essentially transverse to a direction of impinging radiation. The radiation collection and transmission element includes front end optics configured to collect the flame radiation, a transmission element configured to transmit the collected flame radiation, and a taper element configured to direct the transmitted flame radiation onto the row of detectors of the flame sensor element and broaden a lateral intensity distribution of the impinging radiation.

An exemplary embodiment also provides a method for determining a characteristic of a flame using any one of the above-described exemplary flame scanning devices according to the present disclosure. The exemplary method includes determining, based on signals received from at least one of the first group of detectors and the second group of detectors, at least one of the flame temperature, the fuel type, the flame stability, flame pulsations, a fuel/air mixture ratio, a presence of the flame presence, a quality of the flame, a type of the flame type, and flame stoichiometry.

BRIEF DESCRIPTION OF THE DRAWINGS

The patent or application file contains at least one drawing executed in color. Copies of the color drawings are enclosed.

Additional refinements, advantages and features of the present disclosure are described in more detail below with reference to exemplary embodiments illustrated in the drawings, in which.

DETAILED DESCRIPTION

Figure 1:
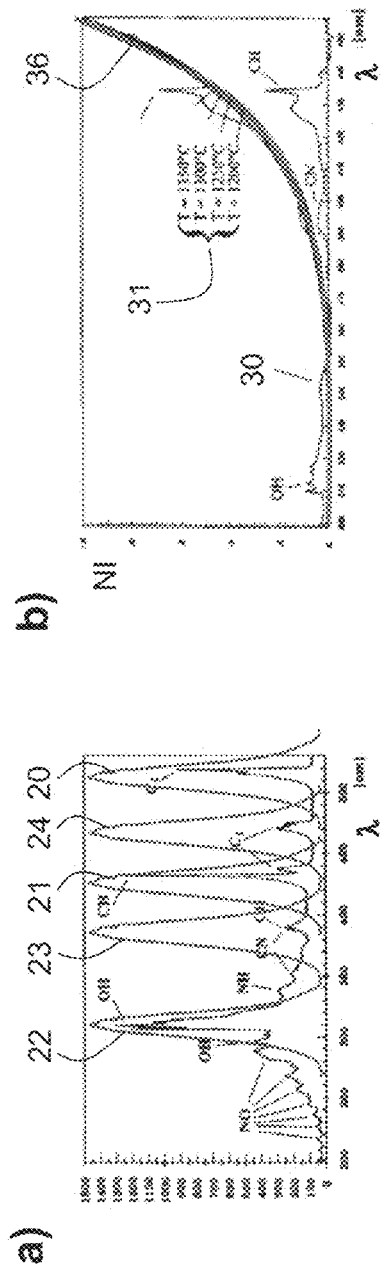
FIG. 1a) shows a natural chemiluminescence spectrum for the case of combustion of a gaseous fuel including the observation windows of the diodes in a wavelength range of 200 nm-540 nm.
FIG. 1b) shows a coal and/or oil chemiluminescence spectrum of the diffusion flame including the theoretical Planck radiation curve for the corresponding flame temperature in a wavelength range of 250 nm-500 nm.
FIG. 1c) shows the schematic setup for the determination of the temperature, e.g., for background correction or flame type detection in the near infrared range.
FIG. 1d) shows the theoretically calculated Planck radiation for a given temperature indicating the two measurement wavelengths as indicated in FIG. 1c)
FIG. 1e) shows the soot emissivity versus wavelength for two chosen values of observation.
Figure 1:
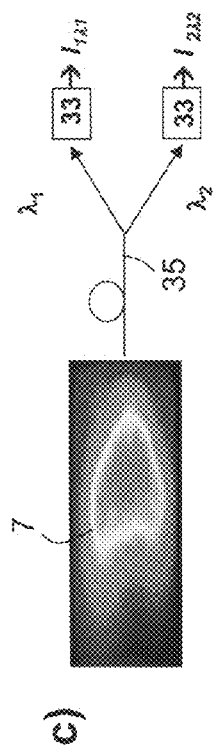
Figure 1:
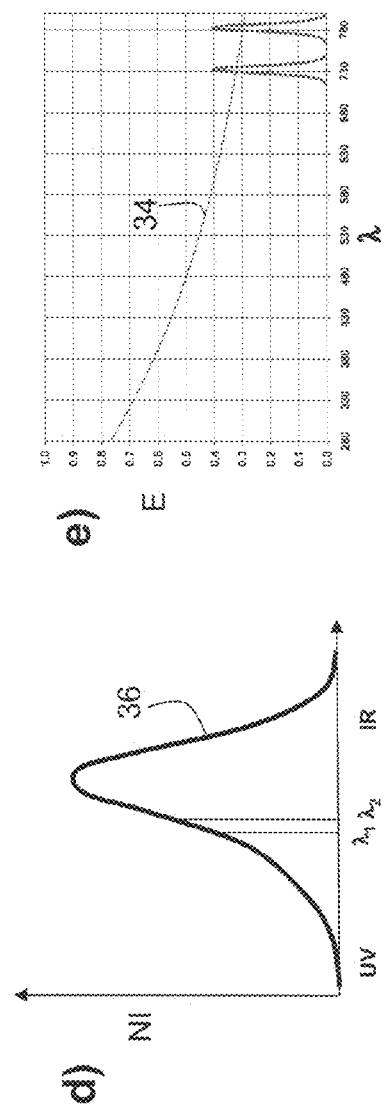

Exemplary embodiments of the present disclosure provide a new flame scanner with high sensitivity and reliability. The exemplary flame scanner combines the flame on/off-status and at the same time characterizes the flame (stochiometry and/or temperature).

An exemplary embodiment provides a flame scanning device for monitoring a flame. The exemplary flame scanning device includes a radiation collection and transmission element for collecting flame radiation and transmitting it to detection elements, a flame sensor element for the detection of radiation and conversion into electrical signals, and an evaluation unit for the conversion of the electrical signals into flame parameters.

According an exemplary embodiment of the present disclosure, the flame sensor element includes at least two individual detectors, e.g. photodiodes, each with individual central detection wavelengths and a narrow width of observation window, e.g. provided by filters, such as interference filters located in front of the detectors, for example. The detectors are specifically chosen to each have an individual central detection wavelength and to have a width of observation window such that the observed windows are not overlapping and are only covering individual regions of interest of the spectrum of radiation.

It should be also noted that groups of detectors having the same or essentially the same central detection wavelength can be used for a specific observation window. However, these groups are subsequently used jointly or together for the evaluation of the corresponding species in the observation window. For increased sensitivity, for example, it is possible to have two or more detectors for the same observation window. In this case, however, according to an exemplary embodiment of the present disclosure, there are at least two such groups, wherein the observation windows of the two groups are not overlapping.

According to an exemplary embodiment of the present disclosure, in contrast to the concepts associated with conventional devices, a feature of the flame scanning device is not to monitor the full contiguous spectrum emitted by the flame, but only to monitor very specifically those regions, where chemiluminescence of species is expected and/or where a specific infrared range of interest is to be observed. Another related feature of exemplary embodiments of the present disclosure is that a dispersive element is not needed, which simplifies the setup and makes it very robust.

Correspondingly, according to an exemplary embodiment of the present disclosure, the flame sensor element includes at least two detectors, e.g., at least three detectors of a first group, whose central detection wavelengths are in the range of 300 nm-700 nm, as well as at least two detectors, e.g., three detectors of a second group, whose central detection wavelengths are in the infrared range, such as in the near infrared range between 800 nm-1000 nm, for example.

Accordingly, in the first group of detectors, there is, for example, one detector with a central detection wavelength of 315 nm for the detection of the chemiluminescence of OH*, and one detector with a central detection wavelength of 440 nm for the detection of the chemiluminescence of CH*. Both would have a width of observation (full width at half height) such that there is essentially no overlap of these widths of observation. For example, each of the detectors in the first group could have a width of observation of 25 nm.

According to an exemplary embodiment, the detectors can have a width of observation window in the range of 10 nm-30 nm, such as in the range of 15 nm-30 nm, for example. However, broader windows are also possible, as long as there is no overlap. For example, with respect to the detectors in the range of 300 nm-700 nm, a width of observation can chosen to be in the range of 20 nm-30 nm. For the detectors in the range of 800 nm-1000 nm (NIR) or for values thereabove but still in the infrared range, the width of observation can be chosen to be in the range of 10 nm-20 nm.

The width of observation, such as for the detectors with central detection frequencies in the range of 300 nm-700 nm, where specific line shapes of selected transitions are to be detected and integrated, can be adapted to the line shape or line width of the correspondingly detected signal, for example. If, for example, a sharp narrow band which is not overlapped by other transitions shall be observed, the width of observation can be chosen to be rather narrow, for example in the range of 20 nm-24 nm. This is possible, for example, in case of the CH* transition where an intense and sharp signal is observed (see FIG. 1a).

If, on the other hand, there is a broad signal which is maybe even overlapping with other signals, the observation width can be chosen to be wider. This happens, for example, in the case of the OH* transition. In such a situation of broad and overlapping signals, it may, however, also be more advantageous under certain conditions to choose a narrow width of observation in order to keep out undesired overlapping signals. This can be determined on a case-by-case basis. In any case, these adaptations and determinations should take into account all the possible combustion conditions to be observed. This means that the overall optimum has to be found for different types of fuel and for the different possible combustion conditions (e.g. different values of $\lambda$, etc.).

According to an exemplary embodiment, these individual observation windows are provided by means of specific and individually adapted filters, such as interference filters, for example, in front of the detectors. If the detectors are arranged in a row as outlined below, also a gradual (interference) filter with a gradual change of the selected frequency along the row could be used.

According to an exemplary embodiment of the present disclosure, the detectors of the first group can have central detection wavelengths adapted to the peaks of the chemiluminescence of the radical species selected from the group of: OH* (centred around 315 nm), CH* (centred around 440 nm), $C_2$* (centred at around 470 nm and 515 nm, respectively), CN* (centred around 385 nm), for example, at least of OH and CH. In case of $C_2$, two different transitions can be observed, namely the one for $\Delta v=0$ at approximately 515 nm and the one for $\Delta v=-1$ at 470 nm.

According to an exemplary embodiment, the individual central detection wavelengths of the detectors of the first group can be selected to lie within at least one of the following individual ranges: 300 nm-325 nm (OH*); 375 nm-400 nm (CN*); 420 nm-450 nm (CH*); 460 nm-480 nm and 500 nm-530 nm (both $C_2$*).

According to an exemplary embodiment, the detectors of the first group and of the second group are all arranged in a (single) row arranged essentially transverse to the direction of impinging radiation. It is, however, also possible to have two or several rows of detectors one above the other, wherein in this case, for example, the above-mentioned groups of detectors having the same central detection wavelength would either be located one above the other or located at opposite or corresponding positions with respect to the symmetry plane of the transverse radiation distribution for compensation purposes.

A particularly tailored device with high sensitivity and reliability can be provided, if all the detectors of the first group are located in the central part (central in the sense of with respect to the transverse direction to the radiation direction) of the row, where the intensity of the impinging light is highest. This is because the first group of detectors is generally detecting weaker signals. The detectors of the second group, which detect generally stronger signals in the infrared or near infrared range, are all arranged at both lateral outer parts of the row, where the light distribution in transverse direction has already dropped to lower values. This specific arrangement of detectors along the transverse direction allows particularly efficient light detection which is tailored to the sensitivity of the expected signals and the light distribution along the transverse direction with respect to the radiation impinging onto the sensor.

In addition, according to an exemplary embodiment, the arrangement within one group along the row can be adapted. Accordingly, it is, for example, possible to determine the expected integrated intensities of the signals to be observed (see, for example, FIG. 1a). Again, these adaptations and determinations should take into account all the possible combustion conditions to be observed. This means that the overall value should be found for different types of fuel and for the different possible combustion conditions (e.g., different values of $\lambda$ etc.). Once the detector is determined which is expected to see overall the smallest intensity (for example, the CN* signal in FIG. 1a), the corresponding detector for this signal can be put into the central position of the row of the detector where the highest intensity of radiation is impinging on the detector. Analogously and in accordance with the order of expected intensities for the different detectors, the detectors can be arranged on the row. Generally, the larger the expected intensity for a certain bandwidth, the more the detector shall be placed in an offset position from the center of the row. Exceptions to this principle are possible, if there is a frequency which is not as important for the actual measurement process, e.g. because it is only used as a control measurement. In this case, a detector for detecting such a less important frequency can also be placed further towards the outside or offset position.

An exemplary embodiment of the present disclosure provides that the detectors of the first group and of the second group are arranged in a row arranged essentially transverse to the direction of impinging radiation, wherein the radiation collection and transmission element includes a front end optics (for example, a temperature resistant lens system) for collecting the flame radiation, for example, collected from the heat release zone of the flame, a transmission element, such as a high temperature fiber bundle (for example comprising several thousand optical fibres) for transmitting the collected flame radiation, for example, as well as a taper element for directing the transmitted flame radiation onto the row of detectors of the flame sensor element.

Such a taper element can include a transparent block (transparent for the radiation to be transmitted) with essentially parallel upper and lower boundary surfaces, with essentially parallel input and exit surfaces orthogonal to the main direction of radiation, the input surface directly or indirectly, e.g. via a beam splitter as discussed below, attached to the transmission element, the exit surface directly or indirectly attached to the flame sensor element (which can e.g. be glued directly onto the flame sensor element) and diverging, polished lateral surfaces orthogonal to the upper and lower boundary surfaces. The opening angle can be enclosed by the lateral surfaces towards the flame sensor element is in the range of 1°-10°, such as 2°-6°, for example 3°-5°.

According to an exemplary embodiment, the radiation coming from the transmission element can have a very steep intensity distribution centered around the symmetry axis of the radiation beam. If this radiation distribution is directed to the flame sensor, particularly if the flame sensor is a single row of detectors, this can lead to a situation in which the centrally located detectors in the row receive very strong radiation, while the detectors located off axis, i.e. offset laterally, only receive weak radiation. The exemplary tapering structure leads to a significant broadening of the intensity distribution and can therefore ensure that the radiation intensity along the row is not as unevenly distributed as without this element, and that more detectors can be used efficiently in a row.

It should be noted that the above-described exemplary taper element, in combination with a row of detectors, is independent of the further characteristics of the main disclosure as outlined above, and is a new and inventive concept. It is hitherto unknown to use such a device for broadening the intensity distribution which is subsequently to be detected on a photodiode array.

An exemplary embodiment of the present disclosure provides the device further includes a camera, such as a high dynamic CMOS camera, for taking time resolved image pictures of the flame. According to an exemplary embodiment, in front of the camera, there is located a gradient index lens for focusing, and the data from the camera can be used as an input of the evaluation unit and/or for information of the presence of the flame and/or its contours and/or its position.

According to an exemplary embodiment, with the presence of a camera, the radiation collection and transmission element can include a front end optics for collecting the flame radiation, a transmission element, such as a high temperature fiber bundle, for example, for transmitting the collected flame radiation, as well as a beam splitter which splits the radiation to directed on the one hand to the camera and on the other hand to the flame sensor element. Like this, the same front end optics and transmission element can be used for serving the flame sensor element as well as the camera simplifying the setup.

An exemplary embodiment of the present disclosure also provides a method for determining a characteristic of a flame using a flame scanning device as described above. The flame sensor element can include at least two detectors, e.g., three or more detectors of a first group, whose central detection wavelengths are in the range of 300 nm-700 nm, as well as at least two detectors, e.g., three or more detectors of a second group, whose central detection wavelengths are in the infrared range, such as in the near infrared range between 800 nm-1000 nm. Depending on the signals received from the first group and/or of the second group, various attributes can be determined, such as one or more of the flame temperature, the fuel type, the flame stability, flame pulsations, a fuel/air mixture ratio, flame presence, flame quality, flame type, and/or flame stoichiometry. According to an exemplary embodiment, the exemplary flame scanning device enables detection and distinguishing between gaseous fuel, oil and/or coal. Furthermore, if an additional camera is present, the exemplary flaming scanning device enables determination of temperature and/or stoichiometry as well as the presence and the shape of the flame.

According to an exemplary embodiment of the method, the signals of the second group of detectors are used for the determination of the flame temperature based on the theoretically calculated Planck radiation, eventually corrected for soot emissivity and/or instrument factors. The correspondingly detected background radiation can be used as a compensation of the background influence for the evaluation of the signals of the first group of detectors. The corresponding possible general formula for the evaluation of the temperature based on the infrared and/or near infrared detectors measuring at individual frequencies are given in the detailed description.

According to an exemplary embodiment of the method, the flame stoichiometry can be determined by the signals of the first group of detectors, eventually corrected for background based on signals of the second group of detectors as detailed in the paragraph above, wherein wavelet algorithms, for example, are used.

Exemplary embodiments of the present disclosure also provide a flame scanning device as detailed above, and the use thereof, for the control of the combustion process in a flame, such as for controlling combustion parameters, including parameters selected from the group of: fuel feed rate, fuel type, fuel mixture, combustion air feed rate, combustion chamber pressure, and/or post-processing of combustion products.

During the combustion process of organic fuel, such as coal, oil, gas or synthetic gas, certain species are always present in the heat release zone: the more intensively radiating ones are the CH*, OH*, CN*, $C_2$* molecules. These molecules can be found in an excited state and they can act within the flame zone in different manners (spontaneous emission, quenching etc).

The corresponding natural chemiluminescence spectrum for a diffusion flame ($\lambda$=1) of a gaseous fuel is given in FIG.

1a. Strong individual signals are present for CH* (roughly at 430 nm) and OH* (roughly at 310 nm). Further transitions for CN* and $C_2$* can be seen, as well.

A different flame characteristic is observed for coal and oil combustion and the corresponding chemiluminescence spectrum for a diffusion flame. This is illustrated in FIG. 1b, in which the band emission signal is indicated with reference number 30. The signals of the individual species can be strongly masked by background radiation. The corresponding contribution of Planck radiation, which is indicated with reference number 36, increases with increasing wavelength and this contribution depends on the flame temperature as indicated by reference number 31 for several values.

Most of the flame scanners use this spontaneous emission for characterizing the flame in the UV. The drawback of this approach is that it is difficult to extract the signal from all other radiation like Planck due to particulates (e.g. soot particles, their corresponding contribution calculated theoretically and indicated with reference number 34 illustrated in FIG. 1e) or wall radiation of the combustor chamber.

FIG. 1d) illustrates the theoretical Planck intensity distribution 36 for one given temperature. It is shown that measurement at two different wavelengths $\lambda_1$ and $\lambda_2$, it should allow to back-calculate the corresponding temperature.

For the case of near infrared detection, this is schematically illustrated in FIG. 1c. It is possible to measure the radiation of the flame 7, to transmit the corresponding intensity by means of transmission optics 35, and to direct and/or split it to two detectors, CCD or single detectors 33, with individual detection wavelengths, and to calculate the corresponding intensity at a given wavelength $\lambda_1$ or $\lambda_2$.

To calculate the corresponding temperature, the following formula can be used:

$$T = \frac{C_2\left(\frac{1}{\lambda_1} - \frac{1}{\lambda_2}\right)}{\ln\frac{I_{1\lambda_1}}{I_{2\lambda_2}} + \ln\frac{S_{\lambda_2}}{S_{\lambda_1}} + \ln\left(\frac{\lambda_1}{\lambda_2}\right)^5}$$

wherein T is the temperature, $C_2$ is the second radiation constant, $\lambda_1$ and $\lambda_2$ are the central frequencies of the detectors, $I_{1\lambda 1}$ and $I_{2\lambda 2}$ the corresponding intensities, and $S_{\lambda 1}$ and $S_{\lambda 2}$ are correction factors which can, for example, be calculated theoretically. If three detectors are used, this formula can be evaluated three times for the possible pairs of intensities/detector values, thereby increasing the reliability of the corresponding temperature evaluation.

Another possibility for the calculation of the flame temperature is using absorption of species in the infrared range for longer wavelengths. This approach involves a set up as shown in FIG. 2a, in which, due to the longer wavelengths, specific detectors (InGaAs-type) 41 are implemented for intensity detection.

Figure 2:
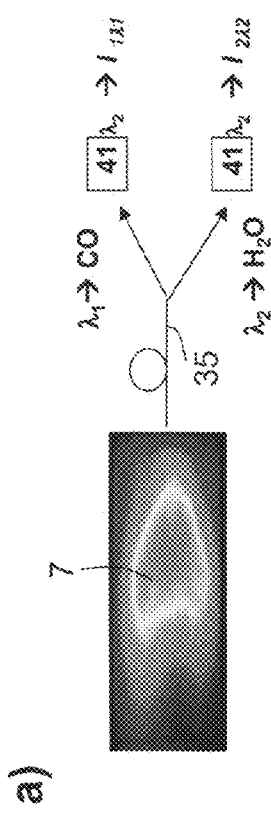
FIG. 2a) shows the schematic setup for the determination of the temperature, e.g., for background correction or flame type detection in the infrared range.
FIG. 2b) shows the absorption spectrum of carbon dioxide, carbon monoxide and water in the infrared range.
FIG. 2c) shows the ratio of and the individual values of the integral of carbon dioxide intensity and of the integral of water intensity, wherein on the x-axis the adiabatic temperature in Kelvin is given, on the left side the integral of water or carbon dioxide is indicated, and on the right side their ratio is shown.
Figure 2:
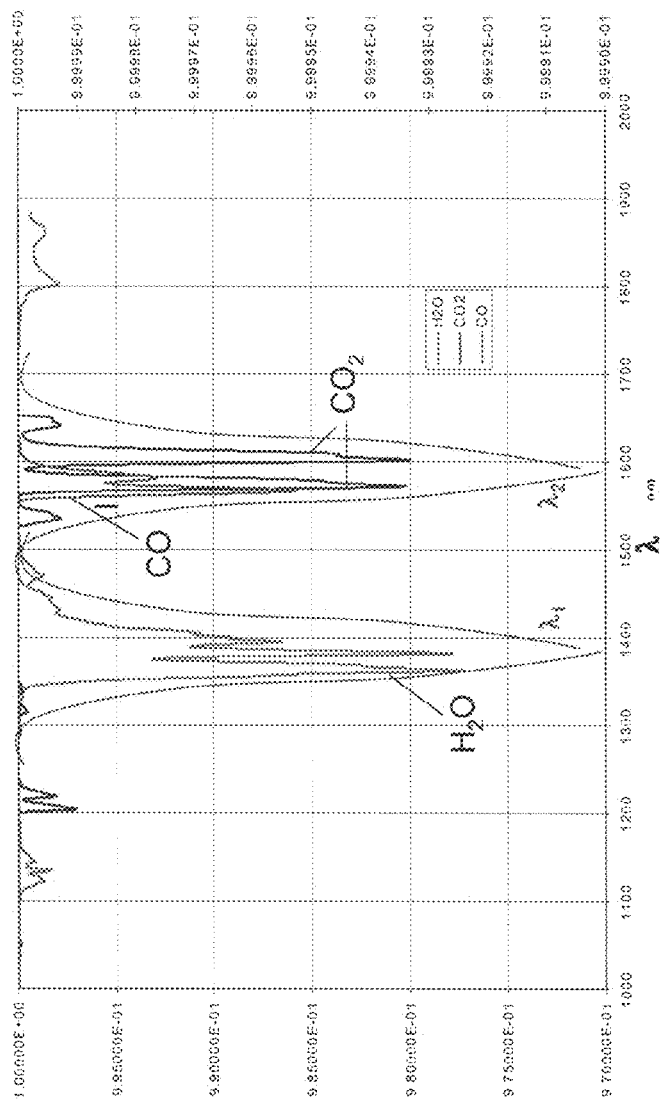
Figure 2:
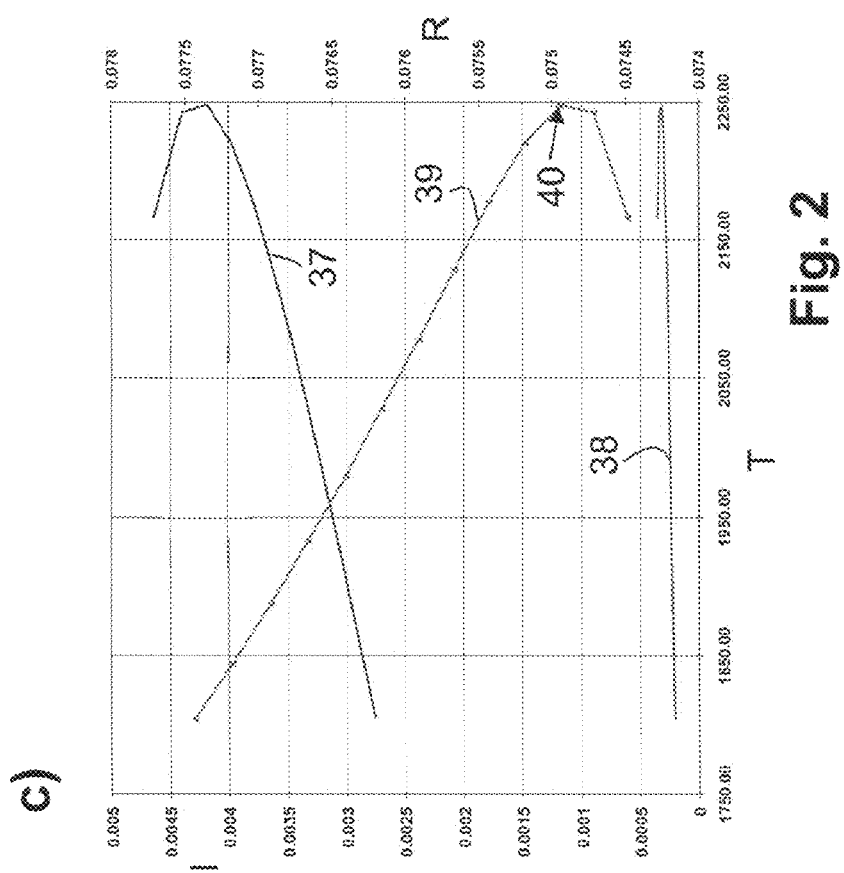

In this case, a passive measurement (e.g., without additional irradiation from the device, the excitation of the species being provided by the radiation of the flame itself) is performed in an absorption spectrum as schematically illustrated in FIG. 2b at the two frequencies $\lambda_1$ and $\lambda_2$, which is still on the left side of the spectral cut-off of quartz material, thus still allowing conventional optics. Using this approach, the temperature can be calculated using the simplified formula $$T = \alpha \frac{I_{1\lambda_1}}{I_{2\lambda_2}}$$

In the above formula, a equals a proportionality constant. However, compared to the first formula, there is the drawback of more sophisticated detectors being involved for this measurement. Using this type of measurement, the corresponding temperature can be evaluated based on the functional relationship as illustrated in FIG. 2c.

If, in this case, the integrated $H_2O$ intensity 37 is measured in one detector, and the integrated $CO_2$ intensity 38 is measured in a second detector, and if the ratio 39 of these integrated intensities is taken by means of a simple relationship (e.g. quotient), the temperature can be calculated directly and unambiguously. This can be utilized for the case of a diffusion flame (indicated with arrow 40) as well as for essentially all other stoichiometric conditions.

Figure 3:
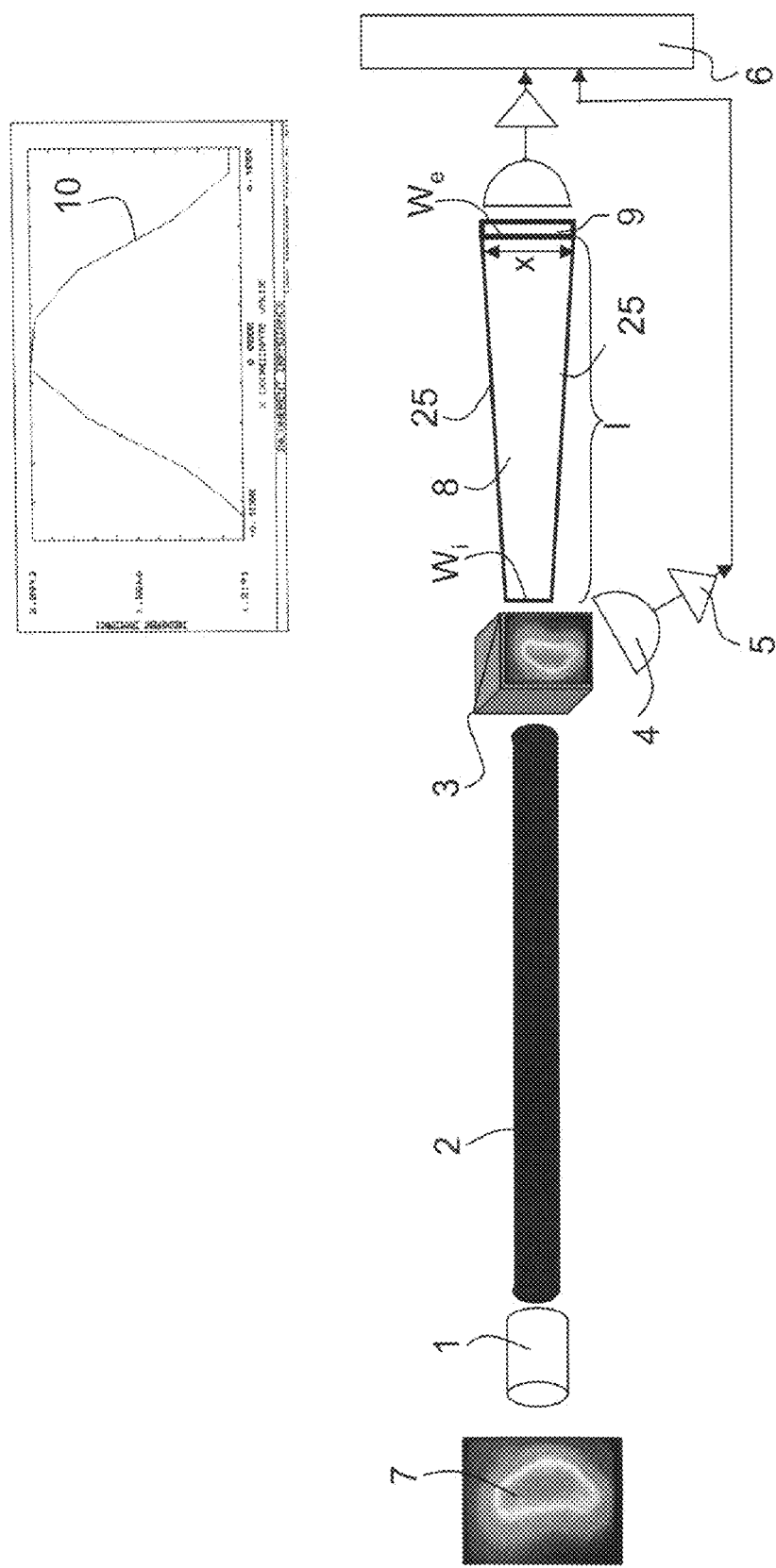
FIG. 3 shows a schematic of the setup of the flame scanner according to an exemplary embodiment of the present disclosure.

The exemplary flame scanning device for measuring the flame is schematically illustrated in FIG. 3. A flame 7 emits radiation. A front end optics element 1 for capturing this radiation is provided as the front end element of the device. For example, the optics 1 can be directed to the heat release zone of the flame. The radiation is subsequently transmitted away from the hot flame region by means of a high-temperature fiber bundle 2. This high-temperature fiber bundle can, for example, be composed of several tens of thousands of fibers. The length of this high-temperature fiber bundle can be in the range of 1 m-5 m, for example. A beam splitter 3 is located at the output side of the fiber bundle 2. The beam splitter 3 splits the radiation beam into two beams.

One of these beams is directed to a camera 5. According to an exemplary embodiment, the camera 5 can be a high dynamic CMOS camera, for example of the LinLog type as available from Photonfocus AG, Switzerland. To focus the output of the beam splitter 3 to the camera 5, a gradient index (GRIN) lens 4 is placed in front of the camera 5. The output of the camera 5 is used as input to an evaluation unit 6, which can include digital signal processing elements, frame grabber elements, USB etc. The output of the camera 5 can be used for flame presence detection, flame pulsation detection, and/or flame shape detection, for example.

The other beam from the beam splitter 3 is directed to the actual flame sensor element, which can be, for example, a single row of diodes, e.g. a diode array 9. The use of a row of detectors 9 simplifies the setup, but on the other hand raises the problem that the light beam which exhibits a distinct maximum around the center position, will only deliver high intensities in the central region of the detector 9. In order to alleviate this problem of narrow light distribution, a taper element 8 can be used. The taper element 8 is a light conducting element which flattens the distribution by approximately a factor of 2-10, e.g., by a factor of five, resulting in a distribution 10 as illustrated in the top inset of FIG. 3. The taper element 8 can be a transparent block, e.g., transparent for the radiation to be transmitted, and in FIGS. 3 and 4 the taper element 8 is illustrated in a top view. According to an exemplary embodiment, the top and bottom surfaces of the taper element 8 can be parallel to each other (they may however also be tapered), while the two lateral surfaces 25 are opening towards the detector side. A conical shape would be possible, as well.

For a total length of 1 mm of 30 mm of the taper element 8, it has a total width $w_i$ in a transverse direction of 2 mm at the input side. The total width of the taper element 8, and at the exit site is $w_e$=12.8 mm. According to an exemplary embodiment, the opening angle of the tapering element 8 can be in the range of ±10° (e.g., a total opening angle in the range of 20°). The lateral surfaces 25 can be polished surfaces, and due to the reflection of the radiation within the taper element 8 on the lateral surfaces 25 (total internal reflection), the intensity distribution can be broadened, thus leading to a higher intensity at the outer sides of the row in the detector 9.

Figure 4:
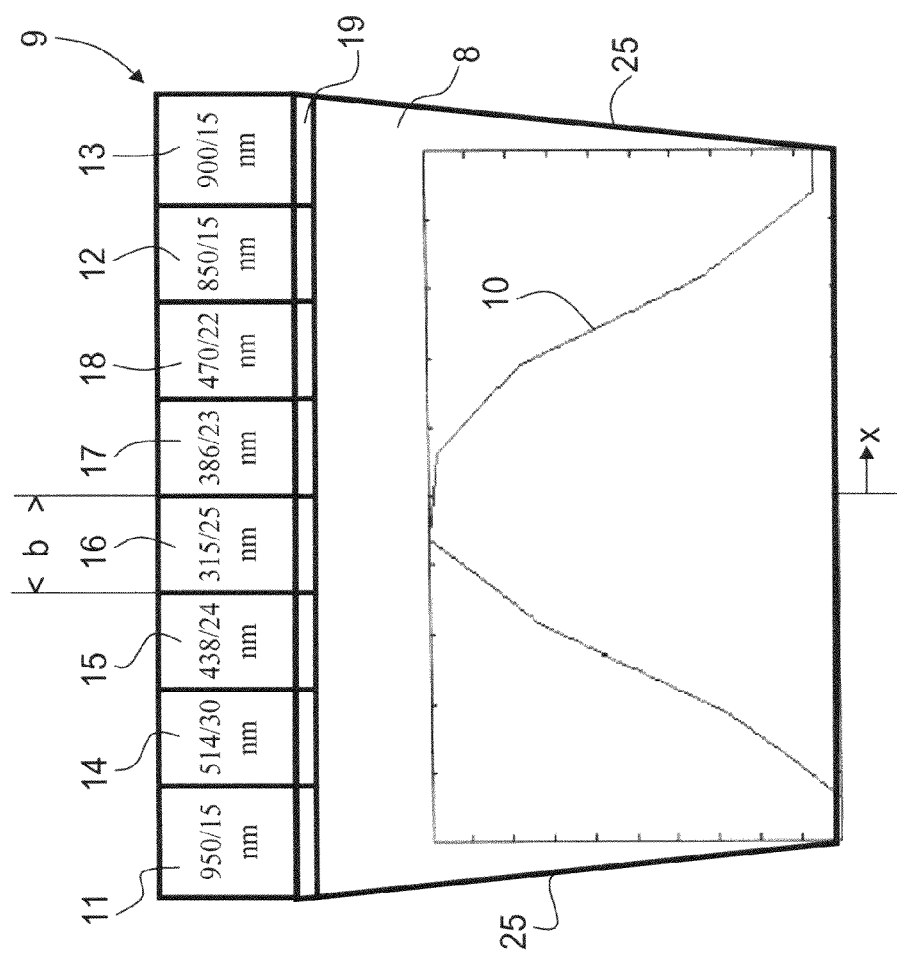
FIG. 4 shows a schematic of the exit region of the optical taper including the intensity distribution along the transverse direction of the light beam and including the details on the diode array for detection.

The output of the detector 9, which will be illustrated and discussed in more detail below in the context of FIG. 4, is directed to the evaluation unit 6. The output of the detector 9 can be used, for example, for temperature detection, detection of the stoichiometry, presence of individual radicals, calculation of background correction, fuel type detection, etc.

In FIG. 4, the top portion of the tapering element 8 and the detector 9 are illustrated in more detail. As shown in FIG. 4, the radiation has a distribution 10 at the output side of the taper element 8. According to an exemplary embodiment of the present disclosure, the individual detectors within the single row 9 can be located along the row depending on the expected intensity in the spectral range of the corresponding detector.

The spectral range of each of the detectors 11-13 can be individually adjusted by means of interference filters 19, which are located in front of the detectors 11-13. Each of these interference filters 19 only allows a specific band of radiation frequencies to pass and to impinge onto the actual detector. The photodiodes acting as the actual detectors can accordingly be all of the same type, where their frequency selectivity can be adjusted by means of the interference filters 19.

The signals which are the least problematic in terms of intensity are the signals in the near infrared range. Therefore, the corresponding detectors 11-13 can be located at the outermost positions near the edge of the row of the detector 9. Three different frequencies can be measured, for example, at 850 nm, 900 nm and 950 nm, as the center frequencies, respectively. Each observation window has a width which is rather narrow, for example, approximately 15 nm. The exemplary arrangement illustrated in FIG. 4 uses the above first possibility of temperature determination, using the above first formula. It is, however, also possible to exchange these detectors with InGaAs detectors, for example, to allow pyrometry in this detection range or to use the above second method and the second formula for the evaluation of the temperature, for example.

In between these near infrared detectors, the lower wavelength detectors 14-18 are located. According to an exemplary embodiment, five detectors 14-18 are located, wherein the detectors 16 and 17, centered at 315 nm (window illustrated in FIG. 1a with reference number 22) and 386 nm (window illustrated in FIG. 1a with reference number 23), tailored for the detection of OH* and CN*, respectively, where the overall lowest intensity is expected, are located in the central region of the detector, because the impinging intensity is highest around the center.

According to an exemplary embodiment, somewhat more offset from the center, there is located a sensor 15 centered at 438 nm for the detection of CH* (window illustrated in FIG. 1a with reference 21), and on the other side a further sensor 18 for the detection of the transition $\Delta v=-1$ of the $C_2$ species at a frequency of 470 nm (window illustrated in FIG. 1a with reference 24). Even further towards the edge region, there is located a second sensor 14 for a second transition $\Delta v=0$ of the $C_2$ species at a frequency of 514 nm (window illustrated in FIG. 1a with reference number 20). Other transitions of species present in the flame can be used, as well.

According to an exemplary embodiment, each of the sensor units has a width b in the transverse direction of approximately 1 mm-2 mm, for example, around 1.5 mm. The height (perpendicular to the paper plane in FIG. 4) can be in the range of 2 mm.

In summary, with the exemplary flame scanning device, measurements can be performed with a diode array (8 or 16 diodes) covering the different wavelength regions with the help of interference filters, and the emission of these species can be detected. In addition, 3 narrow regions in the NIR can be detected, which will help, in case of soot emission, to determine the flame temperature by using 3-colors pyrometry (above first formula, applied repeatedly for wavelength pairs). The temperature helps to compute the Planck radiation over the wavelength range of interest and allows this background signal to be subtracted from the emitted radiation of the different species. Both the species radiation and the Planck radiation enable determination of the fuel type like oil, gas or coal; in case of gas fuel, no Planck radiation is expected, whereas in case of fuel oil, a little Planck radiation will be added to the radiation of the species, and finally in case of coal, only the Planck radiation is emitted or detectable.

In case of gas and oil fuels, the temperature of the flame can be determined by the OH*/CH*, OH*/$C_2$* and $C_2$*/CH* ratios, in case of coal fuel the temperature is derived from the 3-colors pyrometry. All diodes can have a bandwidth of a few kHz which allow investigating the flickering behavior of the flame. By using Wavelet algorithms (see e.g. US 2004/0033457, herewith incorporated by reference) it is possible to give redundant information about the flame stochiometry.

In parallel, the light coming from the optics is split in two paths, one covering the above-mentioned diode array and the other one is focused on a CMOS camera. The visible image provides information of the presence of the flame and its contours and eventually its position depending on the viewing angle of the scanner.

The exemplary embodiment as described above and as shown in FIGS. 3 and 4 includes an objective 1, a coherent fiber bundle 2, a beam splitter 3, an imaging optics 4, 5 on the side of the camera 5, and a glass taper 8 which distributes the light collected from the second path more evenly onto the diode array 9. The distribution 10 can be Gaussian, for example, and the uneven lateral light intensity distribution 10 can be utilized to place those filters for which the emitted light is expected to have low intensity (e.g. UV) in the middle or central position of the array (where the intensity distribution 10 is maximal), as shown in FIG. 4. Every diode is coupled to a programmable amplifier in order to detect low level intensities (e.g. in the case of gas as fuel) and therefore to give a better signal to noise ratios for the calculations of the various algorithms.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS 1 front-end optics
2 high-temperature fiber bundle
3 beam splitter
4 gradient index (GRIN) lens 5 high dynamic CMOS camera
6 evaluation unit (Digital signal processing—DSP, frame grabber, USB etc)
7 flame to be observed
8 taper element
9 diode array
10 intensity distribution of light in 8 at the exit of 8 along lateral x-coordinate
11 IR diode, center frequency 950 nm, full width of observation 15 nm
12 IR diode, center frequency 850 nm, full width of observation 15 nm
13 IR diode, center frequency 900 nm, full width of observation 15 nm
14 $C_2$ ($\Delta v=0$) diode, center frequency 514 nm, full width of observation 30 nm
15 CH diode, center frequency 438 nm, full width of observation 24 nm
16 OH diode, center frequency 315 nm, full width of observation 25 nm
17 CN diode, center frequency 386 nm, full width of observation 23 nm
18 $C_2$ ($\Delta v=-1$) diode, center frequency 470 nm, full width of observation 22 nm
19 individual interference filter elements in front of 11-18
20 observation window of 14
21 observation window of 15
22 observation window of 16
23 observation window of 17
24 observation window of 18
25 side faces of 8, lateral faces
30 band emission signal
31 calculated Planck function for specific temperatures
32 measured spectrum
33 CCD or a single detector
34 soot emissivity
35 transmission optics
36 calculated Planck function for one specific temperature
37 integral $H_2O$ intensity
38 integral $CO_2$ intensity
39 ratio of 38/37
40 operation point of diffusion flame, $\lambda=1$
41 InGaAs-detector at given wavelength
$w_i$ width of 8 at entry
$w_e$ width of 8 at exit
l length of 8
NI normalized intensity
$\lambda$ wavelength
UV ultraviolet range
IR infrared range
VIS visible range
EI emission intensity
b width of individual diode element
counts

What is claimed is:

1. A flame scanning device for monitoring a flame, comprising:
a radiation collection and transmission element configured to collect flame radiation and transmit the collected flame radiation to detection elements;
a flame sensor element configured to detect radiation and convert the detected radiation into electrical signals; and
an evaluation unit configured to convert the electrical signals into flame parameters, wherein:
the flame sensor element comprises at least two individual detectors each with an individual central detection wavelength and a width of observation window, respectively, the individual central detection wavelength and the width of observation window not overlapping and covering individual regions of interest of the spectrum of radiation, respectively;
the flame sensor element comprises at least two detectors of a first group whose central detection wavelengths are in the range of 300 nm-700 nm, and at least two detectors of a second group whose central detection wavelengths are in the infrared range;
the detectors of the first group and the detectors of the second group are arranged in a row arranged essentially transverse to a direction of impinging radiation; and
all the detectors of the first group are located in a central part of the row, and the detectors of the second group are all arranged at one lateral outer position or at both lateral outer positions of the row.

2. A flame scanning device for monitoring a flame, comprising:
a radiation collection and transmission element configured to collect flame radiation and transmitting the collected flame radiation to detection elements;
a flame sensor element configured to detect radiation and convert the detected radiation into electrical signals; and
an evaluation unit configured to convert the electrical signals into flame parameters, wherein:
the flame sensor element comprises at least two individual detectors each with an individual central detection wavelength and a width of observation window, respectively, the individual central detection wavelength and the width of observation window not overlapping and covering individual regions of interest of the spectrum of radiation, respectively;
the flame sensor element comprises at least two detectors of a first group whose central detection wavelengths are in the range of 300 nm-700 nm, and at least two detectors of a second group whose central detection wavelengths are in the infrared range;
the detectors of the first group and the detectors of the second group are arranged in a row arranged essentially transverse to a direction of impinging radiation; and
the radiation collection and transmission element comprises front end optics configured to collect the flame radiation, a transmission element configured to transmit the collected flame radiation, and a taper element configured to direct the transmitted flame radiation onto the row of detectors of the flame sensor element and broaden a lateral intensity distribution of the impinging radiation.

3. The flame scanning device according to claim 1, wherein the flame sensor element comprises at least one of at least three detectors of the first group, and at least three detectors of the second group.

4. The flame scanning device according to claim 1, wherein:
the detectors have a width of observation window in the range of 10 nm-30 nm; and
the individual observation windows are provided by means of interference filters in front of the detectors.

5. The flame scanning device according to claim 1, wherein the detectors of the first group have central detection wavelengths adapted to the peaks of the chemiluminescence of radical species selected from the group of: OH, CH, $C_2$, CN, preferably at least of OH and CH.

6. The flame scanning device according to claim 5, wherein the individual central detection wavelengths of the detectors of the first group are selected to lie within at least one of the following individual ranges: 300 nm-325 nm; 375 nm-400 nm; 420 nm-450 nm; 460 nm-480 nm; and 500 nm-530 nm.

7. The flame scanning device according to claim 1, wherein:
the detectors of the first group and the detectors of the second group are arranged in a row arranged essentially transverse to the direction of impinging radiation; and
all the detectors of the first group are located in the central part of the row, and the detectors of the second group are all arranged at one lateral outer position or at both lateral outer positions of the row.

8. The flame scanning device according to claim 1, wherein the radiation collection and transmission element comprises:
front end optics configured to collect the flame radiation collected from a heat release zone of the flame; a transmission element in the form of a high temperature fiber bundle for transmitting the collected flame radiation; and
a taper element configured to direct the transmitted flame radiation onto the row of detectors of the flame sensor element and broaden a lateral intensity distribution of the impinging radiation.

9. The flame scanning device according to claim 8, wherein the taper element comprises:
a transparent block having essentially parallel upper and lower boundary surfaces, essentially parallel input and exit surfaces orthogonal to the main direction of radiation, and diverging lateral surfaces orthogonal to the upper and lower boundary surfaces, the input surface directly or indirectly being attached to the transmission element, the exit surface directly or indirectly being attached to the flame sensor element, and
wherein the opening angle enclosed by the lateral surfaces towards the flame sensor element is in the range of $\pm 1°$ to $\pm 25°$.

10. The flame scanning device according to claim 1, comprising:
a camera configured to take time resolved image pictures of the flame; and
a gradient index lens located in front of the camera, wherein the evaluation unit is configured to receive data from the camera for at least one of information of the presence of the flame, contours of the flame, and a position of the flame.

11. The flame scanning device according to claim 10, wherein the radiation collection and transmission element comprises:
a front end optics configured to collect the flame radiation,
a transmission element configured to transmit the collected flame radiation; and
a beam splitter configured to split the radiation to direct the radiation onto the camera and onto the flame sensor element.

12. A method for determining a characteristic of a flame using a flame scanning device according to claim 1, the method comprising:
determining, based on signals received from at least one of the first group of detectors and the second group of detectors, at least one of the flame temperature, the fuel type, the flame stability, flame pulsations, a fuel/air mixture ratio, a presence of the flame presence, a quality of the flame, a type of the flame type, and flame stoichiometry.

13. The method according to claim 12, comprising:
determining, based on the signals of the second group of detectors, the flame temperature based on the theoretically calculated Planck radiation, which is corrected for at least one of soot emissivity and instrument factors;
detecting a background radiation corresponding to the determined flame temperature; and
using the detected background radiation as a compensation of the background influence for the evaluation of the signals of the first group of detectors.

14. The method according to claim 12, comprising:
determining the flame stoichiometry based on the signals of the first group of detectors, which are corrected for background based on signals of the second group of detectors, in accordance with wavelet algorithms.

15. The flame scanning device according to claim 1, wherein the flame scanning device is configured to control at least one of the combustion process, and combustion parameters, the combustion parameters being selected from the group consisting of: fuel feed rate, fuel type, fuel mixture, combustion air feed rate, combustion chamber pressure, and post-processing of combustion products.

16. The flame scanning device according to claim 1, wherein the central detection wavelengths of the detectors of the second group are in the near infrared range between 800 nm and 1000 nm.

17. The flame scanning device according to claim 4, wherein:
the detectors have a width of observation window in the range of 15 nm-30 nm; and
the detectors are photodiodes.

18. The flame scanning device according to claim 9, wherein:
the lateral surfaces are polished; and
the opening angle enclosed by the lateral surfaces towards the flame sensor element is in the range of at least one of $\pm 5°$ to $\pm 20°$, and $\pm 8°$ to $\pm 15°$.

19. The flame scanning device according to claim 2, wherein the flame sensor element comprises at least one of at least three detectors of the first group, and at least three detectors of the second group.

20. The flame scanning device according to claim 2, wherein the central detection wavelengths of the detectors of the second group are in the near infrared range between 800 nm and 1000 nm.

21. The flame scanning device according to claim 2, wherein:
the detectors have a width of observation window in the range of 10 nm-30 nm; and
the individual observation windows are provided by means of interference filters in front of the detectors.

22. The flame scanning device according to claim 21, wherein:
the detectors have a width of observation window in the range of 15 nm-30 nm; and
the detectors are photodiodes.

23. The flame scanning device according to claim 2, wherein the detectors of the first group have central detection wavelengths adapted to the peaks of the chemiluminescence of radical species selected from the group of: OH, CH, $C_2$, CN.

24. The flame scanning device according to claim 23, wherein the individual central detection wavelengths of the detectors of the first group are selected to lie within at least one of the following individual ranges: 300 nm-325 nm; 375 nm-400 nm; 420 nm-450 nm; 460 nm-480 nm; and 500 nm-530 nm.

25. The flame scanning device according to claim 2, wherein the taper element comprises:
a transparent block having essentially parallel upper and lower boundary surfaces, essentially parallel input and exit surfaces orthogonal to the main direction of radiation, and diverging lateral surfaces orthogonal to the upper and lower boundary surfaces, the input surface directly or indirectly being attached to the transmission element, the exit surface directly or indirectly being attached to the flame sensor element, and wherein the opening angle enclosed by the lateral surfaces towards the flame sensor element is in the range of ±1° to ±25°.

26. The flame scanning device according to claim 25, wherein:
    the lateral surfaces are polished; and
    the opening angle enclosed by the lateral surfaces towards the flame sensor element is in the range of at least one of ±5° to ±20°, and ±8° to ±15°.

27. The flame scanning device according to claim 10, wherein the camera is a high dynamic CMOS camera.

28. The flame scanning device according to claim 2, comprising:
    a camera configured to take time resolved image pictures of the flame; and
    a gradient index lens located in front of the camera,
    wherein the evaluation unit is configured to receive data from the camera for at least one of information of the presence of the flame, contours of the flame, and a position of the flame.

29. The flame scanning device according to claim 28, wherein the radiation collection and transmission element comprises:
    a beam splitter configured to split the radiation to direct the radiation onto the camera and onto the flame sensor element.

30. The flame scanning device according to claim 28, wherein the camera is a high dynamic CMOS camera.

31. A method for determining a characteristic of a flame using a flame scanning device according to claim 2, the method comprising:
    determining, based on signals received from at least one of the first group of detectors and the second group of detectors, at least one of the flame temperature, the fuel type, the flame stability, flame pulsations, a fuel/air mixture ratio, a presence of the flame presence, a quality of the flame, a type of the flame type, and flame stoichiometry.

32. The method according to claim 31, comprising:
    determining, based on the signals of the second group of detectors, the flame temperature based on the theoretically calculated Planck radiation, which is corrected for at least one of soot emissivity and instrument factors;
    detecting a background radiation corresponding to the determined flame temperature; and
    using the detected background radiation as a compensation of the background influence for the evaluation of the signals of the first group of detectors.

33. The method according to claim 31, comprising:
    determining the flame stoichiometry based on the signals of the first group of detectors, which are corrected for background based on signals of the second group of detectors, in accordance with wavelet algorithms.

34. The flame scanning device according to claim 2, wherein the flame scanning device is configured to control at least one of the combustion process, and combustion parameters, the combustion parameters being selected from the group consisting of: fuel feed rate, fuel type, fuel mixture, combustion air feed rate, combustion chamber pressure, and post-processing of combustion products.

* * * * *